(12) United States Patent
Fogle

(10) Patent No.: US 10,849,310 B2
(45) Date of Patent: Dec. 1, 2020

(54) PET LITTER BOX AND CLEANING SYSTEM

(71) Applicant: Eric Warren Fogle, Forestville, MD (US)

(72) Inventor: Eric Warren Fogle, Forestville, MD (US)

( * ) Notice: Subject to any disclaimer, the term of this patent is extended or adjusted under 35 U.S.C. 154(b) by 998 days.

(21) Appl. No.: 15/016,460

(22) Filed: Feb. 5, 2016

(65) Prior Publication Data

US 2016/0150756 A1     Jun. 2, 2016

Related U.S. Application Data

(63) Continuation-in-part of application No. 14/590,352, filed on Jan. 6, 2015.

(60) Provisional application No. 61/997,168, filed on May 23, 2014.

(51) Int. Cl.
    *A01K 1/01*         (2006.01)
    *B25G 1/04*         (2006.01)

(52) U.S. Cl.
    CPC .............. *A01K 1/0114* (2013.01); *B25G 1/04* (2013.01)

(58) Field of Classification Search
    CPC .... A01K 1/0114; A01K 1/011; A01K 1/0107; A01K 1/0125; A01K 23/005; A01K 1/01; A01K 1/0132
    USPC ................................ 119/166, 165, 161, 168
    See application file for complete search history.

(56) References Cited

U.S. PATENT DOCUMENTS

| | | | | |
|---|---|---|---|---|
| 5,921,596 A * | 7/1999 | Sheriff | ...................... | B07B 1/02 209/418 |
| 6,295,948 B1 * | 10/2001 | Bowron | ............... | A01K 1/0107 119/165 |
| 6,588,369 B2 * | 7/2003 | Carlisi | ................. | A01K 1/0107 119/166 |
| 7,628,118 B1 * | 12/2009 | Nottingham | ......... | A01K 1/0114 119/166 |
| 7,942,460 B2 * | 5/2011 | Boskett | ................ | A01K 1/0114 119/161 |
| 8,336,497 B2 * | 12/2012 | van Zuilekom | ..... | A01K 1/0107 119/165 |

(Continued)

OTHER PUBLICATIONS

Advertisement: http://www.amazon.com. Cats Rule Stand Up and Scoop Telescoping Litter Scoop by Cats Rule, May 17, 2016, 6 pages.

(Continued)

*Primary Examiner* — Peter M Poon
*Assistant Examiner* — Jeffrey R Larsen
(74) *Attorney, Agent, or Firm* — Breiner & Breiner, L.L.C.

(57) ABSTRACT

A pet litter box cleaning system including a base structure, sieve member, and trash receptacle is provided. The base structure includes a bottom wall and side wall(s) which extend upward from the base wall except in one portion to leave an open side for receiving the sieve member therethrough. The sieve member includes a back wall for extending across the open side, a sifter and handle. The trash receptacle extends from an upraised wall of the base structure. In use, the sieve member is inserted in the base structure and litter filled on top thereof. The litter is cleaned of waste by lifting the sieve member by the handle whereby clean litter passes through the sifter and waste collects on the sifter which can then be disposed of directly into the trash receptacle. Afterward, the empty sieve member is placed back into position in the base structure for further use.

12 Claims, 11 Drawing Sheets

(56) References Cited

U.S. PATENT DOCUMENTS

| | | | |
|---|---|---|---|
| 8,851,014 B2* | 10/2014 | Hecht | .................. A01K 1/0114 119/166 |
| 2007/0084413 A1 | 4/2007 | Oertel et al. | |
| 2007/0163508 A1 | 7/2007 | Gloor | |
| 2008/0164704 A1 | 7/2008 | Boskett et al. | |
| 2009/0199778 A1 | 8/2009 | Kratzer et al. | |
| 2012/0318203 A1 | 12/2012 | Andrade et al. | |
| 2013/0133585 A1 | 5/2013 | Hecht | |
| 2013/0319340 A1 | 12/2013 | Bellini et al. | |

OTHER PUBLICATIONS

Advertisement: http://www.etsy.com, StandNScoop Litter Box, Cat Scoop, May 17, 2016, 7 pages.

* cited by examiner

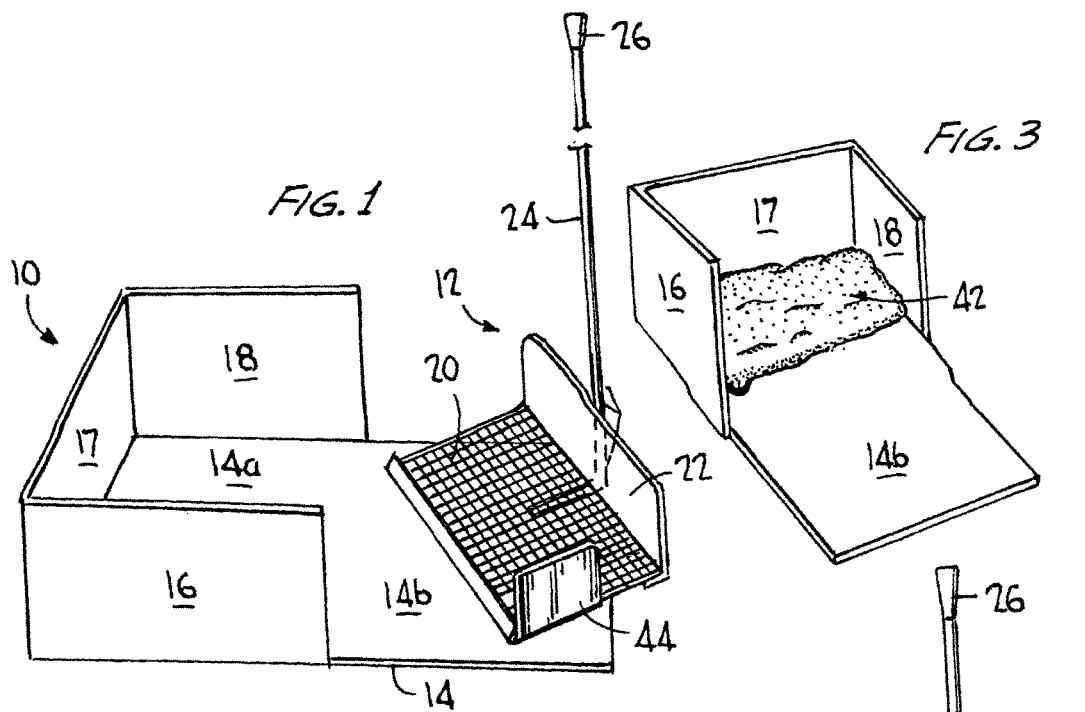
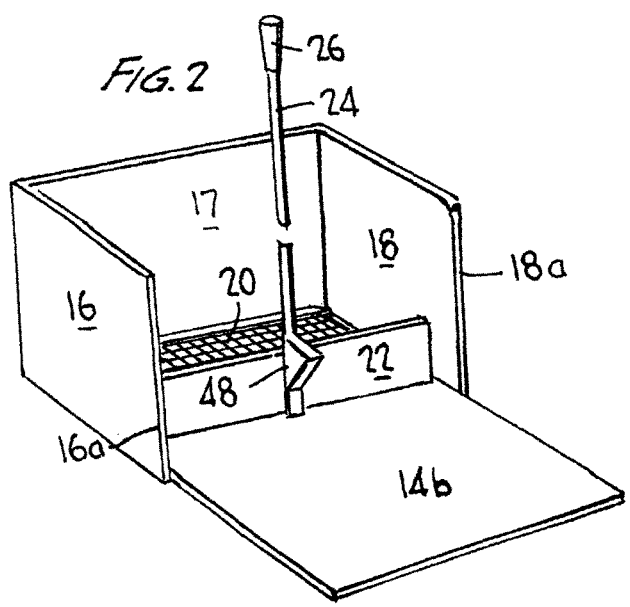
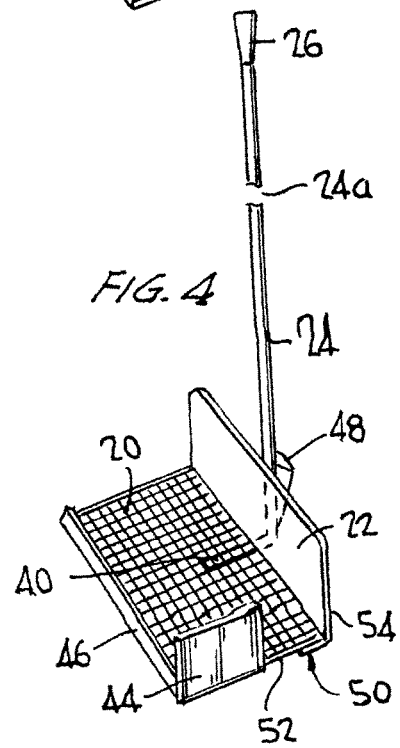
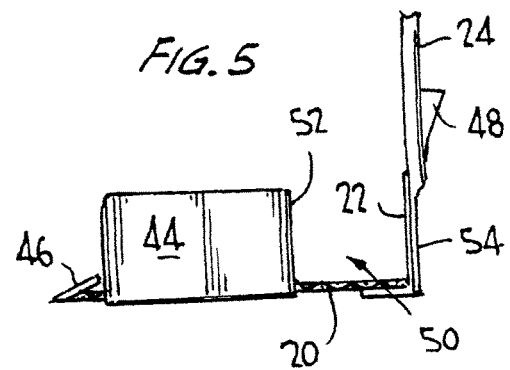

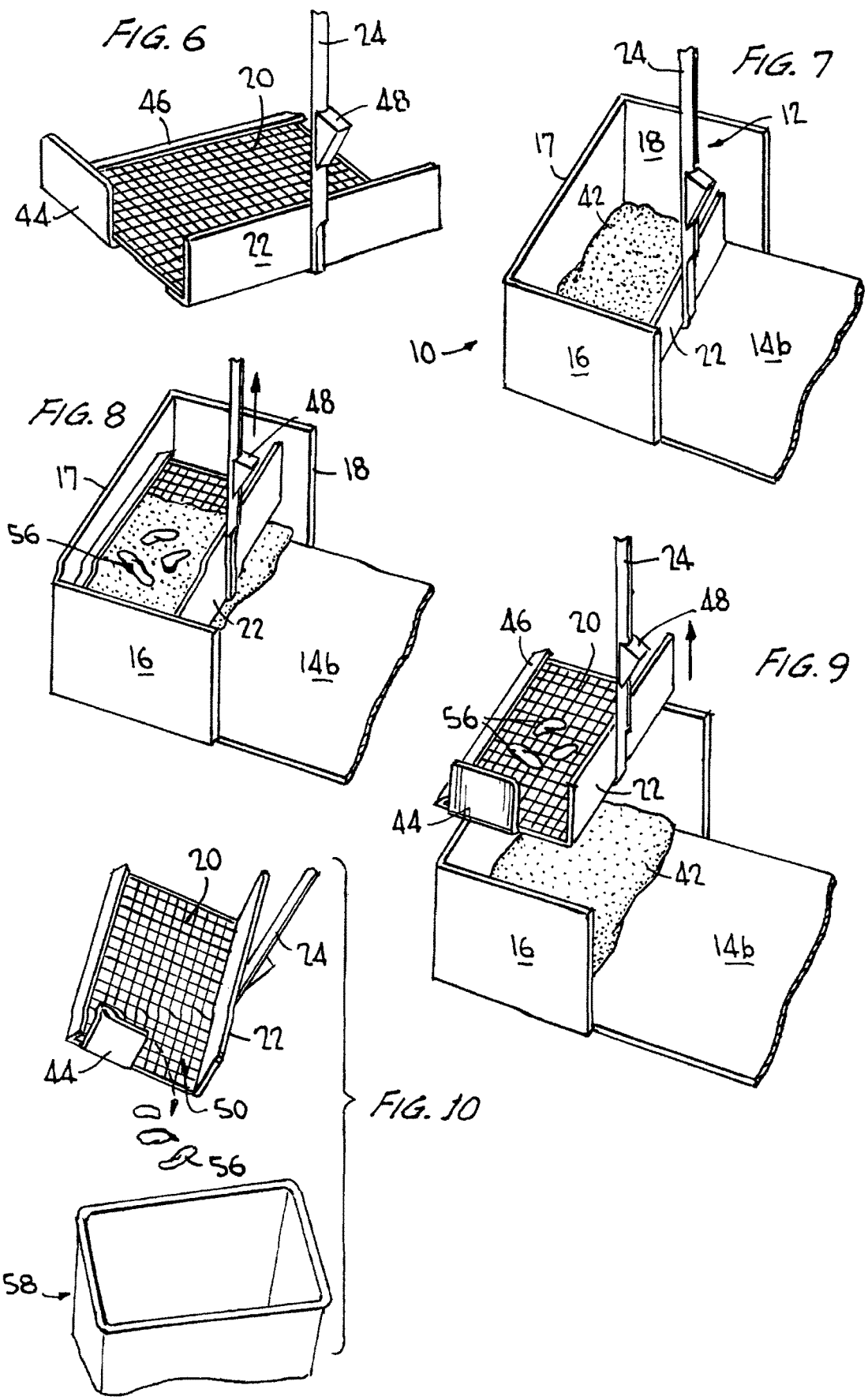

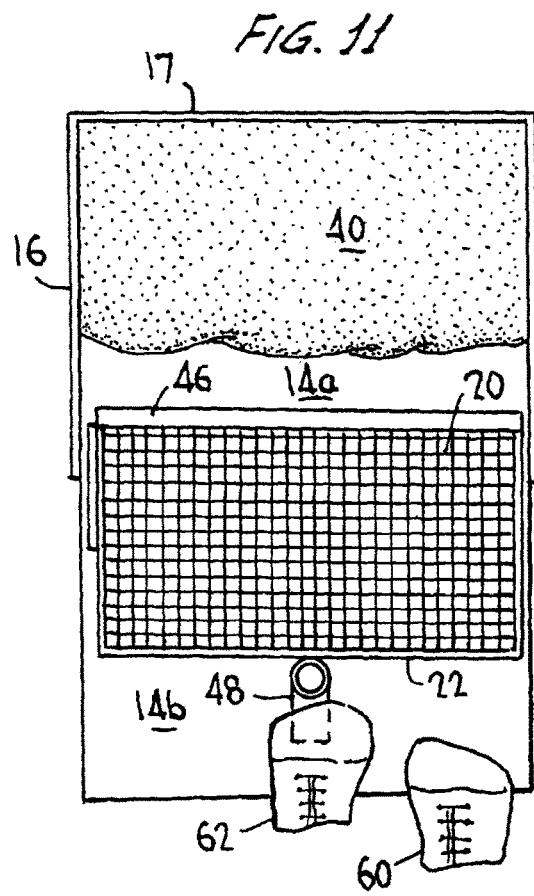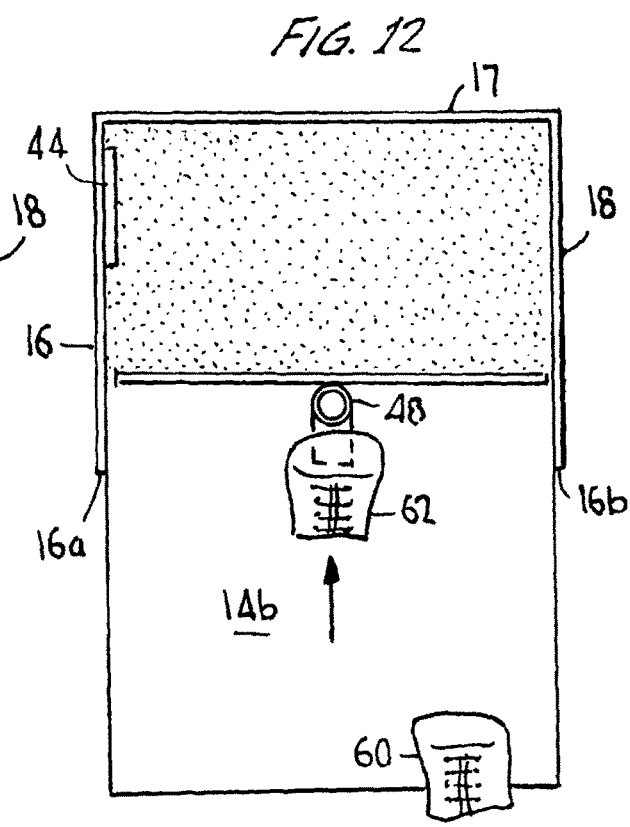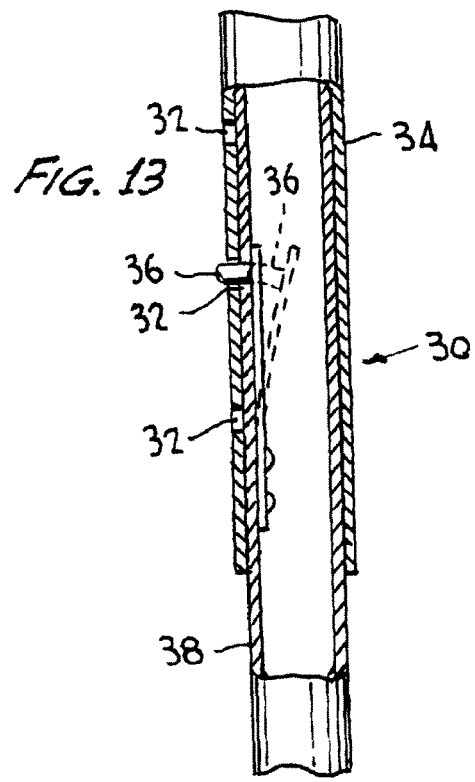

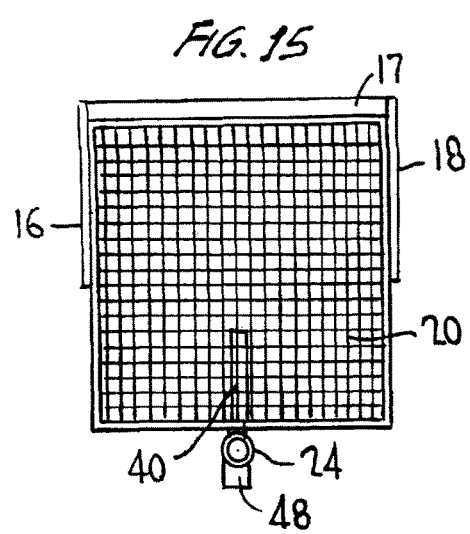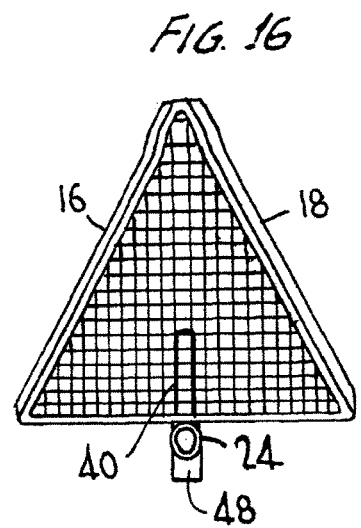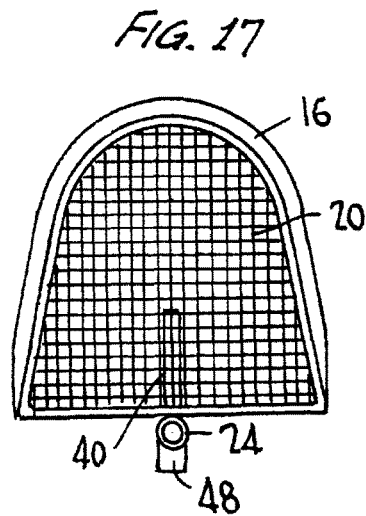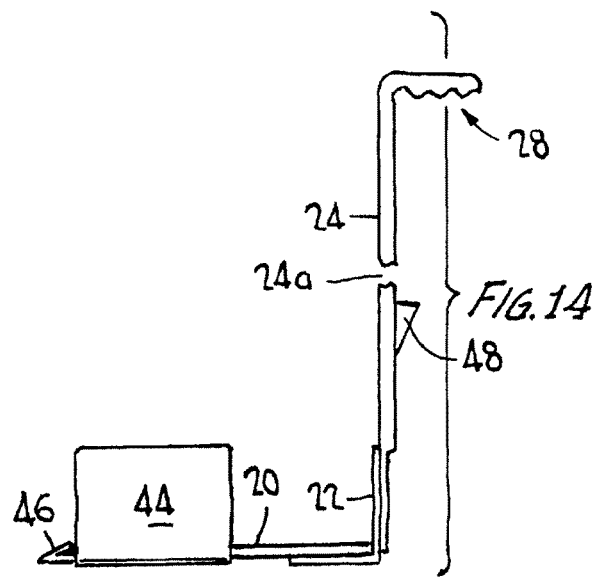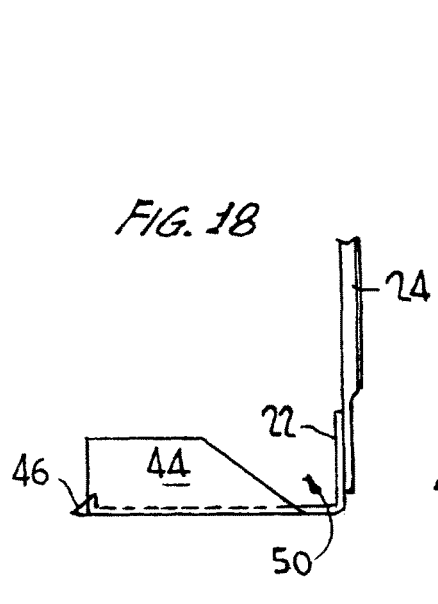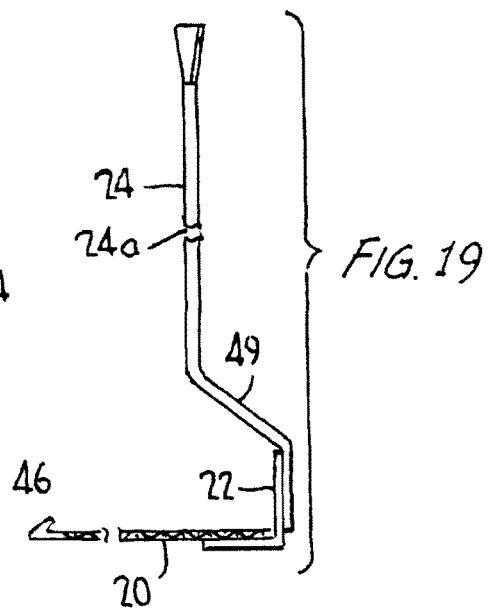

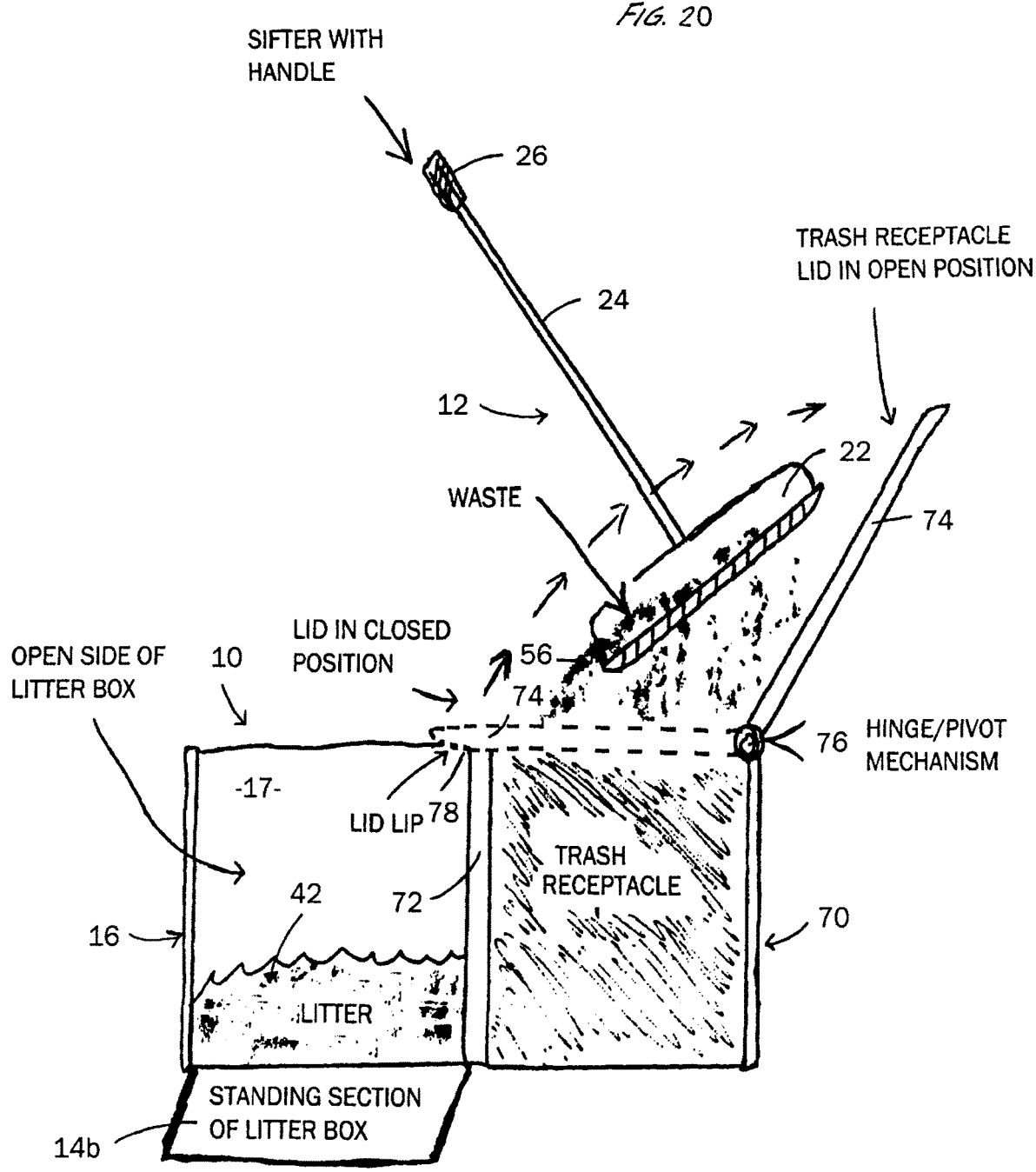

MATCHING VELCRO STRIPS

PET LITTER BOX AND CLEANING SYSTEM

RELATED APPLICATIONS

The present application has common subject matter with and is a continuation-in-part application to U.S. Ser. No. 14/590,352 filed Jan. 6, 2015 entitled "Combined Pet Litter Box And Cleaning Sieve", which claims benefit of U.S. Provisional Application Ser. No. 61/997,168 filed May 23, 2014 entitled "SAVVY SIEVE", which are each incorporated herein by reference.

FIELD OF INVENTION

A pet litter box combined with a sieve for cleaning animal waste from the litter box is described. The litter box and sieve are arranged to be animal friendly to encourage use of the box, while minimalizing physical action necessary for cleaning waste from the litter box. In another embodiment, the pet litter box is further combined with a trash receptacle to provide for ready and clean disposal of waste from the sieve.

BACKGROUND OF THE INVENTION

Pet litter boxes are maintained in households for small pets (primarily cats, but also small dogs, rabbits, ferrets, or other pets of a size that instinctively or through training use a litter box) to allow for urination and excretion by a pet as needed by the pet without the necessity of going outside. Conventional litter boxes are open-top rectangular pans, i.e., containers with four side walls and a bottom wall which are filled with a litter material to absorb urine and cover the feces excreted (which for convenience will be referred to generally herein as "waste" or "waste product"). Numerous types of litter are sold commercially, including clay-based litter, clumping litter made of bentonite or diatomaceous earth or silica-based, biodegradable litter (pinewood pellets, recycled newspaper, barley, dried orange peels, etc.), and granular silicon dioxide. Conventional litter is sold in clumping and non-clumping styles. Due to the odors and visual nature of the waste product in the litter box, litter boxes are generally maintained on the floor in an out-of-the-way location. A hand scoop is used to remove waste from a conventional litter box. When not in use, the scoop is usually placed near the box on a piece of paper or the like (to avoid dirtying the surface) until next use. The location and use of a hand scoop (even if the hand scoop has an extended handle) can require uncomfortable physical exertion by a person when it is necessary to clean the litter box of waste, especially for a person of an older age or if disabled or of lesser strength. For most single cat households, removal of waste from a litter box usually is preferably done at least twice a day. Physical exertion that can create difficulty or discomfort is due to bending over the box, kneeling to avoid bending, and raking arm motions to move the litter to sift through the litter to locate and lift out the waste for placement in the trash. For an elderly or infirm person, this can be followed by a struggle to stand erect once finished cleaning the litter box. If the litter box is hooded, even more physical exertion is required to clean waste from the litter box. Following this action, the waste must then be carried to a trash receptacle for disposal. Due to exertion or difficulty in movement or size of the waste or litter, this step risks dropping some of the scooped waste or litter onto the floor.

While mechanized self-cleaning litter boxes are commercially available for automatic removal of waste from the litter, such are expensive, require electric or battery power (added expense), and/or water hook-up and/or purchase of disposable bags and are subject to not working as well as desired or of breaking down. Generally, over time, self-cleaning litter boxes will also require someone to kneel down or bend over to remove hidden waste that accumulates because such boxes do not result in 100% removal upon each automatic cleaning. Additionally, such mechanized litter boxes are generally covered and, thus, not liked by all pets and become a waste of money.

Therefore, a need exists for a litter box which can be readily cleaned with minimal physical motion or exertion, especially which does not require a person to bend over or kneel, while remaining animal friendly and inexpensive. The present invention provides for these features.

SUMMARY OF INVENTION

The invention is directed to an animal or pet litter box cleaning system including a litter box in combination with a cleaning sieve and a trash receptacle. In use, no bending or kneeling is required by a person to clean waste from the litter box using the sieve and trash receptacle. Minimal manual motion and exertion is required. Risk of waste or litter falling from the sieve is avoided.

The combined cleaning system includes a litter box as a base structure, a sieve member, and a trash receptacle. The sieve member in a non-cleaning mode is inserted in the litter box until such time that the box requires removal of waste therefrom. The sieve then lifts the waste from the litter for placement into the trash receptacle.

The litter box as the base structure includes a bottom wall which is geometrically shaped and has one or more side walls extending upward from the bottom wall in an arrangement that leaves one side open, i.e., no wall extending upward from the bottom wall is present. The side wall can be a one piece curved wall or a plurality of flat adjoined walls so as to provide with the bottom wall, for example, a semi-circle, U-shape, square, triangle, rectangle, or other geometric shape with at least one side area remaining open to allow for insertion of the sieve member into the base structure as described below.

The bottom wall of the base structure includes a second portion extending outward from the open side of the base structure. This second portion is flat and is preferably a continuous extending piece of the bottom wall having the upstanding side wall(s). The extension forming the second portion of the bottom wall does not include side walls and is sized to allow a person to step at least partially on the extension at the time the litter box is to be cleaned as further described below.

The sieve member includes a sifting portion, such as a screen or grid portion, having an arrangement of widthwise and/or lengthwise crossbars, having a geometrical shape which allows for insertion of the sifting portion through the open wall of the base structure where the sifting portion will sit atop the bottom wall and inside the upstanding wall(s) of the base structure. The sifting portion is preferably complementary in shape to the shape of the bottom wall in the base structure. The sifting portion along an end thereof, which is present upon insertion in the base structure along the end of the bottom wall which does not include an upstanding wall (i.e., the open side), includes an upstanding wall which is constructed and arranged to serve as a back wall to substantially close the length of the open side of base structure. The wall of the sieve member, however, has a height sufficiently low that a pet can step or jump over the wall to enter the base structure for use. The other side wall or walls of the base structure are preferably higher to lessen the scattering of litter outside the base structure by a pet scratching in or moving around the litter.

Attached to or extending upward from the back wall of the sieve member is a handle member for manually moving the sifting portion for placement into and out of the base structure and for removal of waste from the base structure. The handle can be of a pre-determined length or height, or can include a mechanism to allow adjustment of the handle height to reduce the handle height when not in use or to customize the height of the handle to a user's height. The handle can include a grip portion, which can be upright, a curved or angled extension at the top free end of the handle such as in the manner of a cane handle, or the like to provide a comfortable and secure gripping surface. Further, the handle member can have a curved or angled body section to allow for a shift in the center of gravity to increase leverage and/or serve as a foot rest for assisting in placement of the sieve member in the base structure.

Preferably, one side end of the sifting portion may include a wall which only partially extends the length of the side end so as to leave an open space between the side wall and the back wall. This structure acts as a funnel when the sieve member is turned sideways to empty waste collected by the screen from the sieve member.

In use, a person by means of the handle member, inserts the sifting portion of the sieve member into the base structure and allows it to sit atop the bottom wall. The back wall of the sieve member acts as a wall in the open wall section of the base structure. Litter is poured on top and over the sifting portion of the sieve member to a desired depth. A pet can enter the base structure over the back wall of the sieve member and use the litter in a conventional manner. When waste is to be removed from the base structure, a person simply takes hold of the grip of the handle and lifts the sieve member out of the open top and open wall side of the base structure. (If the sifting portion does not extend the entire length of the bottom wall, it may be necessary to push the sieve member forward, e.g., by foot, to make sure all waste is caught up by the sifting portion. Alternately, a cleaning implement may be used to push any waste into the area of the sifting portion as described further below.) As the sieve member is lifted, the clean litter passes through the openings in the sifting portion back into the base structure atop the bottom wall. Waste remains on top of the sifting portion. As the sieve member is lifted, the member will get lighter in weight due to the litter sifting through the crossbars of the sifting portion and back into the base structure. The sieve member is then tilted sideways with the back wall, and the side wall when present, of the sieve member serving to direct the waste into a trash receptacle. In the pet litter box cleaning system of the invention, rather than using a separate trash receptacle present at a distance from the litter box, the trash receptacle extends from one side of the base structure. Preferably, the trash receptacle and base structure share at least a portion of a common upraised wall and are one piece. Alternatively, one wall of the trash receptacle can be affixed to one of the upraised walls of the base structure by a suitable joining member, e.g., U-shaped clip(s), snap(s), Velcro strips, overhanging lip, or other suitable material and structure. The adjoined base structure and trash receptacle allows a user to lift the sieve member and tip it directly into the trash receptacle without need to carry it any distance to an independent trash receptacle. This avoids the possibility of dropping any waste or litter from the sieve member, especially in the event that the sieve member is full. The trash receptacle adjoining the base structure will have a lid which preferably is structured to be lifted for opening by the sieve member so as to avoid a user having to touch the trash receptacle or bend over to reach the trash receptacle. The trash receptacle can have a re-usable or disposable liner for easy and sanitary emptying of the trash receptacle.

The pet litter box and cleaning system, preferably, also includes a cleaning implement for scraping any waste which may adhere to the sifting portion, or to move over atop the sifting portion any waste present in the litter in the base structure to insure it is picked up and held by the sieve member during cleaning of the litter. Due to moisture present in some waste, the waste and/or litter may adhere to the crossbars of the sifting portion so having a cleaning implement readily available is advantageous. The cleaning implement has a handle and a scraper head. The handle is preferably of an extended length to avoid the need for bending during use of the implement. The scraper head is angled in relation to the handle so as again to avoid the need to bend over during use of the scraper head. The scraper preferably has at least a plurality of teeth or tines, which can be of different configurations but essentially are shaped so as to extend between the crossbars of the sifting portion. An efficient compatibility between the scraper head and the sifting portion is when the crossbars extend in a parallel widthwise direction with no or a minimal number of lengthwise crossbars so that it is easier to move the teeth of the scraper head over and between the crossbars to clean the sifting portion. In an alternative embodiment, the scraper head can have two ends, one end with a plurality of teeth and one end with a straight edge to move waste over on top of the sifting portion or to scrape across the top of the sifting member to clean it if waste and or litter adhere thereto. The litter box system preferably has a holder member, e.g. clip or hook, made as an integral part of or attached to and extending from a wall of the base structure or trash receptacle wherein the holder member is constructed and arranged to receive and hold the cleaning implement during non-use.

Following emptying of the contents of the sieve member into the trash receptacle, the lid is closed and the sifting portion of the sieve member is then reinserted into the base structure in a manner so that the litter is again atop the sifting portion of the sieve member. The user will step on the extension to the bottom wall during this process so that the base structure does not move when the sieve member is inserted into the base structure by pushing the sifting portion under the litter to again sit on the bottom wall beneath the litter and align the back wall of the sieve member along the edge or within the side walls of the base structure. To further ease insertion of the sifting portion under the litter during reinsertion of the sieve member into the base structure, the forward or leading end of the sifting portion preferably has an inclined lip structure. Further, a foot rest or pedal can be positioned on the back of the handle or back wall of the sieve member, or the handle member can include an angled or curved portion therein, so the person can use foot pressure thereupon to push the sifting portion into place.

Accordingly, the base structure can be cleaned of waste from the litter and the waste disposed of in a trash receptacle without the need to bend or kneel through a single upward lifting motion wherein the weight gets lighter as the sieve member is lifted and emptying is a mere tipping of the sieve member into an adjacent trash receptacle. Reinsertion of the sieve member takes minimal effort shoving the sieve member back into the base structure beneath the litter. This latter action can be eased through the use of body weight on the second portion of the bottom wall of the base structure, an included lip on the forward end of the sifting portion to commence insertion, and the ability to use foot force or power to push the sifting portion into the base structure.

The base structure is preferably made of one piece. The base structure can be made of plastic, cardboard, metal, wood, or other rigid material, or combination thereof. Alternatively, the base structure can be made of multiple components joined or interlocked together, such as by tape, inter-fitting edges, welding, or the like.

The sieve member is also preferably made of one piece. Alternatively, the sieve member can be made of multiple components joined or interlocked together, such as by tape, inter-fitting edges, welding, or the like. The sieve member can also be made of plastic, metal, or other rigid material, or combination thereof. The material selected must have sufficient rigidity to allow for insertion and removal to meet their intended functions.

The trash receptacle can be one piece with the base structure or a separate and adjoining structure affixed to an upraised wall of the base structure by suitable joining members, e.g., clips, snaps, Velcro (mating hook and loop structures) and the like. The lid of the trash receptacle can be adjoined to the receptacle portion by one or more hinge or pivot members, or a living hinge structure when the receptacle is made of plastic. The trash receptacle can be made of plastic, cardboard, metal, wood, or other material so long as the top opening can be made rigid to allow for hands-free emptying of the sieve member into the trash receptacle, e.g., a rigid wire in the shape of a circle, square or the like, with a U-shaped clip(s) or other joinder structure for attachment to an upraised wall of the litter box which then has a bag hanging therefrom by suitable means to receive the waste. The bag can then be removed for disposal when desired.

BRIEF DESCRIPTION OF THE DRAWINGS

FIG. 1 is a perspective view of the base structure and the sieve member prior to insertion of the sieve member into the base structure.

FIG. 2 is a perspective view of the sieve member inserted into the base structure.

FIG. 3 is a perspective view of the base structure having litter therein.

FIG. 4 is a perspective view of the sieve member.

FIG. 5 is a first side view of the bottom half of the sieve member.

FIG. 6 is a back perspective view of the bottom half of the sieve member.

FIG. 7 is a perspective view of the sieve member inserted in the base structure with litter in the base structure on top of the screen portion of the sieve member.

FIGS. 8, 9 and 10 illustrate the sequence for using the sieve member to remove waste from the litter in the base structure.

FIG. 8 illustrates the upward lifting by gripping of the handle portion (grip and person not shown) allowing sifting out of the litter during the raising action.

FIG. 9 shows the retention of waste on the screen of the sieve member once all the litter has been sifted through the screen.

FIG. 10 illustrates funneling the waste through a side opening in the sieve member into a trash receptacle.

FIGS. 11 and 12 illustrate reinsertion of the sieve member under litter in the base structure. In particular, FIG. 11 shows a user's foot on a foot rest or pedal on the rear of the handle to push forward the screen portion of the sieve member under the litter and shows the user's other foot on the extension from the bottom wall to hold the base structure in place.

FIG. 12 shows the screen member inserted under the litter ready for further use.

FIG. 13 illustrates a cut-away view of a portion of a telescoping handle suitable for use in the sieve member to allow for adjustment in height of the handle.

FIG. 14 is a side view of a sieve member with a cane-shaped handle.

FIGS. 15, 16 and 17 show examples of alternate geometric shapes for the base structure and the sifting portion of the sieve member.

FIG. 15 shows a square.

FIG. 16 shows a triangular shape.

FIG. 17 shows a curved wall shape that can be modified to be a semi-circle, U-shape or the like.

FIG. 18 is a partial side view of the sieve member showing an extended and sloped side wall for an end of the screen portion which provides a funnel in combination with the back wall of the sieve member.

FIG. 19 shows an alternate handle member including an angled portion structured to shift the center of gravity and/or serve as a foot rest upon reinsertion of the sieve member in the base structure.

FIG. 20 is a front view of one embodiment of the base structure with a trash receptacle extending from one upraised wall of the base structure wherein the base structure and the trash receptacle have a common upraised wall.

DETAILED DESCRIPTION OF THE INVENTION

Figure 21:
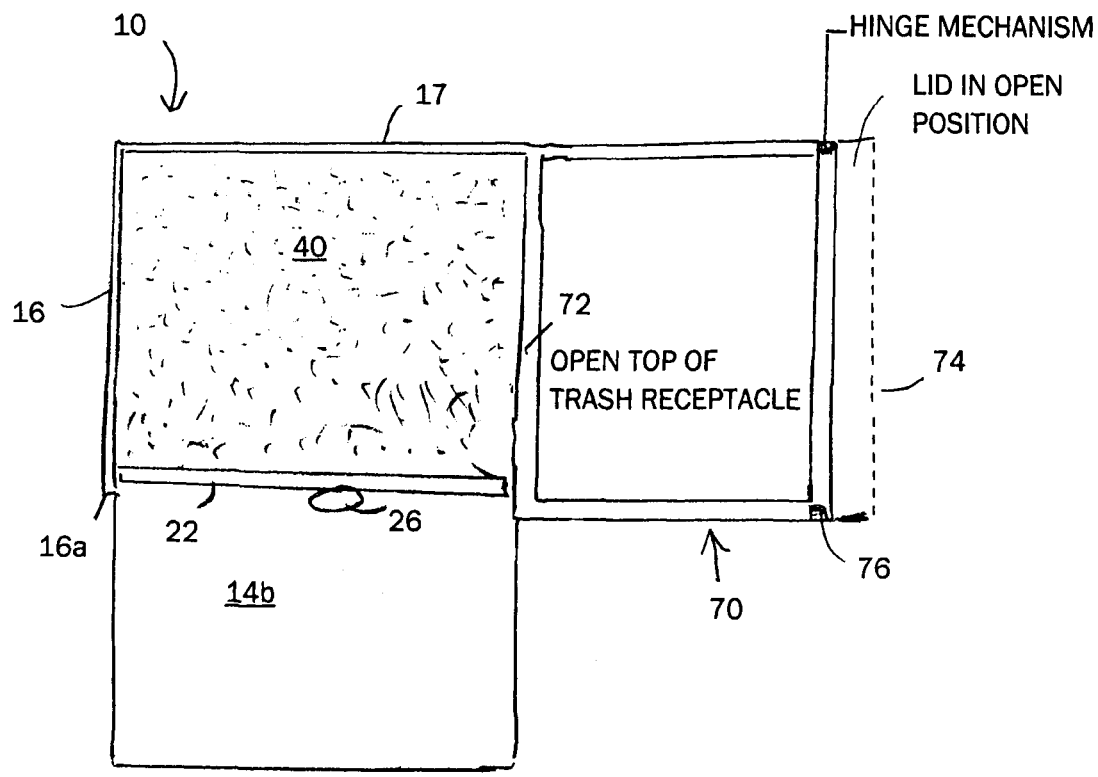
FIG. 21 is a top plan view of the embodiment of FIG. 20 wherein the base structure and the trash receptacle have a common upraised wall.

The invention is directed to a combined litter box and sieve member which is pet friendly in use by not being an enclosed structure and provides for cleaning waste from the litter and disposal of the waste without the need for bending, kneeling or the like through minimal manual motions and lightweight lifting.

The combined litter box and sieve member includes a base structure and a sieve member. The base structure, and accordingly, the sieve member, can be of various geometric configurations to allow for variation in placement of the litter box within a household. Litter boxes are generally used for cats, although other household pets may be trained to use a litter box, such as small dogs, rabbits, ferrets, etc. Conventionally, litter boxes are rectangular to provide a larger space for the animal to move around. Cats generally scratch and/or move around the litter prior to and after use. The invention is described and illustrated herein for ease of discussion as a rectangular structure with the understanding that the alternative shapes may be utilized, such as a square, triangular, semi-circular, U-shaped, circular, etc. as also described and shown herein.

As shown in FIG. 1, the base structure 10 includes a first portion 14a and a second portion 14b. First portion 14a is a bottom wall which defines an area which will, in use, contain the litter and receive the sieve member 12. The first portion 14a of the bottom wall will have one or more side walls extending upward from the free ends of the bottom wall leaving one side open through which the sieve member can be inserted. As shown in FIG. 1, the bottom wall 14a has three upraised walls 16, 17 and 18 and an open space extending between free side ends 16a and 18a of opposite walls 16 and 18. If the base structure were in the alternative shape of a semi-circle or the like, one curved wall could be used, such as in FIG. 17. If the alternative shape was triangular, two upraised flat walls would be used with the third side being open, such as shown in FIG. 16.

As shown in FIGS. 1 and 2, the sieve member 12 includes a sifting portion illustrated as a screen or grid portion 20, a back wall 22 suitably attached to the back end of screen portion 20, and a handle 24. Handle 24 includes a grip 26. The grip can be upright as shown in FIGS. 1-4 or can be of alternative structures, such as a cane shape 28 as shown in FIG. 14. Further, the handle 24 can be of a single predetermined height (FIGS. 1-4 being shown with a broken section 24a to indicate that the selected height of the handle can vary) or can be a telescoping handle 30 as shown in FIG. 13. A suitable telescoping handle can have a plurality of holes 32 on an outer telescoping portion 34 for receiving a projection 36 on an inside telescoping portion 38 to allow for adjustment in height and a locking in place of the desired height. The adjustment in height can be used to minimize the height of the handle when not in use or to customize the height to a particular user. The handle can alternately have an angled or curved section, such as angled section 49 as shown in FIG. 19. This angled or curved section can be structured so as to shift the center of gravity to allow for easier lifting of the sieve member. The angled section can also serve as a foot rest as further described below.

The sifting or screen portion will have an opening or mesh size which can be varied so long as the openings provided allow litter particles to pass therethrough while essentially retaining waste or clumps of litter on the top side of the sifting portion when such is used to sift the litter to remove waste. The sifting portion can be made of various materials (e.g., plastic or metal or combination of materials) and depending on the rigidity (i.e., strength) selected for the sifting portion, a brace 40 may be included to provide additional rigidity (strength) to the sifting portion. The handle 24 may be attached to the back wall 22 and/or the brace 40.

The sifting portion of the sieve member is sized to fit through the open side of the base structure as shown in FIG. 2. As shown in FIG. 3, the area within upraised side walls 16, 17, and 18 and on top of the first portion 14a of the bottom wall is filled with litter 42 as commercially available. In use, the sieve member 12 will be inserted in the base structure 10, with the litter 42 on top of the sifting portion of the sieve member as shown in FIG. 7.

Other features which are preferably present in the sieve member to facilitate ease of use of the sieve member are side wall 44, inclined lip 46, and foot rest or pedal 48 or angled or curved portion 49. The side wall 44 extends a portion of the length of one end of the sifting portion leaving an opening 50 between one end 52 of wall 44 and one end 54 of back wall 22. This provides a funnel structure for emptying waste collected by and on the sifting portion as further described below. Optionally, a wall in the manner of wall 44 can be present on each side end of the sifting portion to allow for ease of disposal in either direction. Inclined lip 46 is along the front or leading edge of the sifting portion and facilitates insertion of the sifting portion of sieve member 12 under the litter contained in base structure 10 as also further described below. Foot rest 48, and angled/curved portion 49, are another means to facilitate reinsertion of the sifting portion of the sieve member under litter 42 as further described below. Lip 46 can be provided in one piece as part of the sifting portion or can be a separate piece attached to the leading edge of the sifting portion.

The use of the combined base structure and sieve member will now be described. The sieve member 12 is inserted in base structure 10 with the sifting portion positioned on top of first portion 14a of bottom wall 14 with back wall 22 equal with or inward of side edges 16a and 18a to at least substantially contain in use litter within the confines of walls 16, 17, 18 and 22 as shown in FIG. 2. Litter 42 is poured over the sifting portion and bottom wall portion 14a into the area bounded by walls 16, 17, 18 and 22 as shown in FIG. 7. A pet will use the litter in base structure 10 to urinate and/or defecate leaving waste product in the form of litter-absorbed liquid or solids. The litter is periodically cleaned of these materials to remove odor, unsightly waste and to make the litter box conducive to re-use. To clean the litter and remove the waste product, a user holds the handle 24 at grip 26 or otherwise as comfortable and lifts the sieve member 12 thereby raising screen 20. The raising action allows clean litter to sift through the openings in screen 20 back into the base structure as shown in FIG. 8 with the waste product 56 being retained on top of screen 20 as shown in FIG. 9. The sieve member can then be tilted to the side, preferably including side wall 44, to direct the waste product 56 out one side of sieve member 12 into a trash receptacle 58 or other appropriate place for disposal. Wall 44 can be extended in length and sloped towards opening 50, as shown in FIG. 18, to enhance the funneling and collection of waste for removal through opening 50.

Following disposal of the collected waste, the sieve member is reinserted into the base structure 10 for continued use. For reinsertion with reference to FIGS. 11 and 12, the user's body weight through placement of a foot 60 on the second portion 14*b* of the bottom wall is used to maintain base structure 10 in place. The sieve member is then slid forward to insert the screen 20 under the litter 42. This is facilitated by inclined lip 46 (when preferably present) and foot rest 48 or angled/curved portion 49 in handle member 24. The inclined lip eases entry of screen 20 under litter 42. The user places a foot 62 on foot rest 48 or section 49 and thereby pushes sieve member 12 forward with screen 20 being inserted in base structure 10 under litter 42, see FIG. 12. The sieve member can either be pushed forward to essentially abut wall 17 and inward of the free edges of side walls 16 and 18 as shown in FIG. 12 to provide a smaller area for when have a smaller animal using the litter box, or the sieve member 12 does not have to be inserted fully forward or can be made shorter than area 14*a* while still aligning wall 22 with free side ends 16*a* and 18*a* of walls 16 and 18 to provide a larger area for the litter when have multiple animals or a larger animal using the litter box.

In the construction of base structure 10, the structure is preferably one piece and made of plastic. This provides for easiest maintenance and cleanliness. However, as would be known to one skilled in the art, the base structure can be constructed of multiple components suitably connected if desired. The same follows for sieve member 12. The screen, back wall and handle of sieve member 12 may be cast as one piece or multiple components as applicable. The dimension of the base structure and sieve member can vary depending on how big or small a structure is desired, and the shape or configuration selected for the overall device to have.

A preferred example of the invention in rectangular form has the following dimensions (it being understood that the dimensions are approximate and can be varied to accommodate manufacturing tolerances and the like):

(1) Sieve member 12—
 (a) screen 20—14 inches×16 inches
  ¼ inch mesh
 (b) handle 24—40 inches (or adjustable within this range or a greater range)
 (c) side panel 44—4 inches×5 inches
 (d) rear panel 22—4 inches×16 inches
 (e) foot rest 48—3 inches×1 inch
 (f) front lip 46—1 inch×16 inches
(2) Base structure 10—
 (a) bottom wall portion 14*a*-17 inches wide×15 inches deep
 (b) bottom wall portion 14*b*-17 inches wide×16 inches deep
 (c) side wall 17—17 inches wide×10 inches tall
 (d) side walls 16 and 18—15 inches wide×10 inches tall.

A further feature, which adds to the ease of use of the pet litter box, is the provision of a trash receptacle extending from an upraised wall of the base structure. The adjacent location of the trash receptacle further simplifies the cleaning process since disposal of the waste collected by the sieve member does not require walking to another location or carrying a trash receptacle to the base structure. The immediate adjacent position also prevents the spillage of any minute waste or litter particles through the sifting portion of the sieve member or accidental spillage. The motions required for cleaning the litter box are minimalized.

Figure 27:
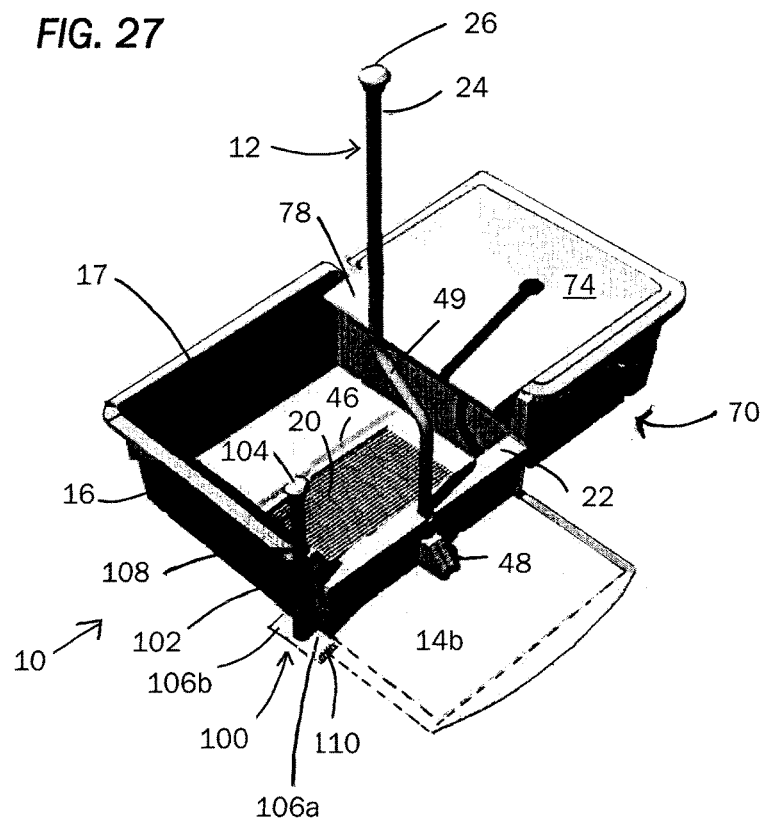
FIG. 27 is a perspective of the pet litter box system including the base structure, sieve member, closed trash receptacle, and a cleaning implement held by a C-shaped holder which is an integral part of a side wall of the base structure.

The trash receptacle can be provided with the base structure as an integral one-piece structure or as a separate add-on structure. Further, the trash receptacle may be present on either side of the structure so as to better accommodate left or right handed users, or accommodate different positioning of the system in a home. One embodiment of the one-piece structure is shown in FIGS. 20 and 21 wherein the trash receptacle 70 and base structure 10 have a common upraised wall 72. In FIGS. 20, 21 and 27, the trash receptacle 70 is illustrated as being of same or similar width and height as the base structure 10. It is to be understood that the dimensions of the trash receptacle can be varied. A beneficial feature of the trash receptacle is that the receptacle has a top opening which is maintained or maintainable in an open position to allow depositing of waste from the sieve member without the need of using a hand to touch or hold the trash receptacle during disposal.

The trash receptacle preferably has a lid 74 to conceal disposed waste from view and control odor from the waste. The lid 74 includes a hinge or pivot mechanism which allows the lid to move between a closed and open position as shown in FIGS. 20, 27 and 29. The lid in a closed position (shown in dotted lines in FIG. 20 and solid lines in FIGS. 27 and 28) has a lip 78 which extends beyond wall 72 so that the sieve member 12 can push against the underside of the extended lip to open the lid 74. The upward motion then allows the sieve member to easily move over the open top of the trash receptacle and the sideways emptying of the waste collected by the sieve member into the receptacle. FIG. 20 illustrates this action. For ease of understanding, as illustrated in FIG. 20, the sieve member 12 is rotated to show the collected waste on the screen portion 20 and being emptied therefrom into trash receptacle 70. In use, the back wall 22 would be seen from the front view since the sole action necessary to clean the base structure and dispose of the waste is to lift the sieve member 12 upward to collect the waste 56 on the sifting portion 20, and in the same lifting motion catch the underside of the extended lip 78 to raise lid 74 to open the trash receptacle and allow dumping of the waste 56 into the receptacle. The lid 74 in an open position preferably opens to an obtuse angle to act as a deflector to any debris during the emptying process and to be retained at an easily reachable position for closing. The empty sieve member is then used to close the lid and is placed back in the base structure for further use. No rotation of the sieve member is necessary in use. The trash receptacle should preferably have a removable liner therein to allow for easy and sanitary emptying of the trash receptacle on a desired basis. The liner can be a reusable plastic or metal liner, or can be a disposable liner, e.g., a plastic bag. The liner can be held in place by conventional means, for example, in the case of a plastic bag by a U-shaped clip holding the bag against the top edges of the receptacle (not shown).

Figure 22:
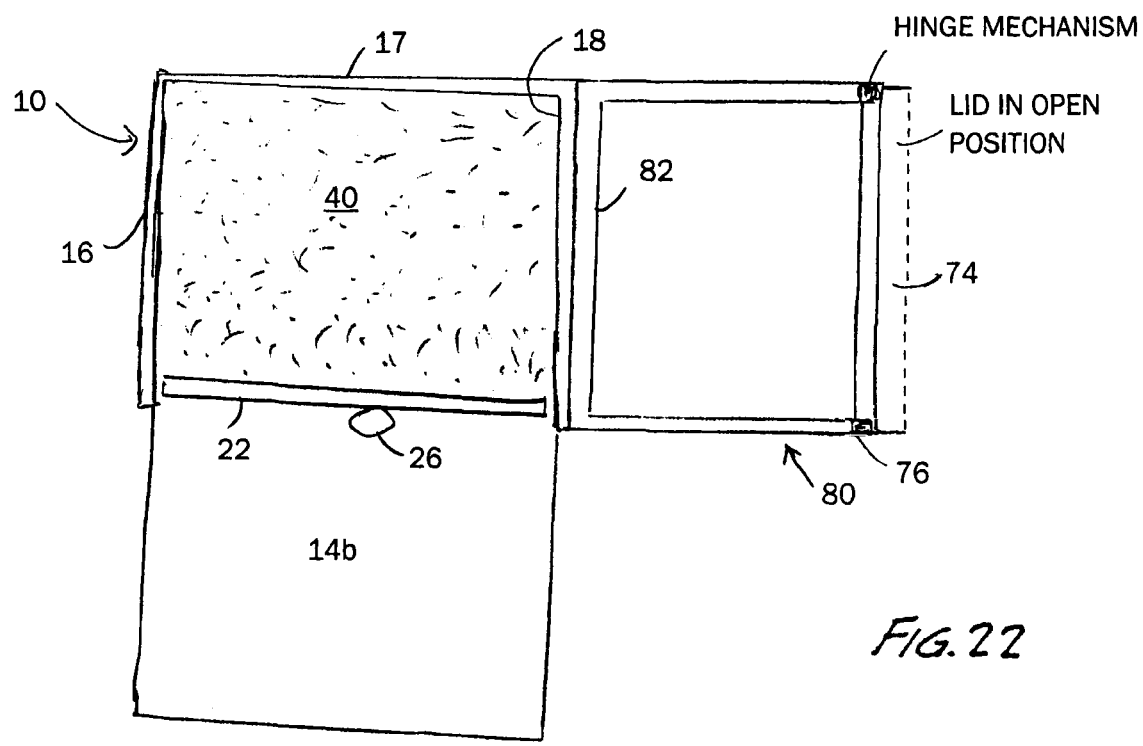
FIG. 22 is a top plan view of another embodiment of the base structure having a trash receptacle extending from one upraised wall of the base structure wherein each of the base structure and the trash receptacle have independent upraised walls wherein two adjacent walls are affixed together.
Figure 26:
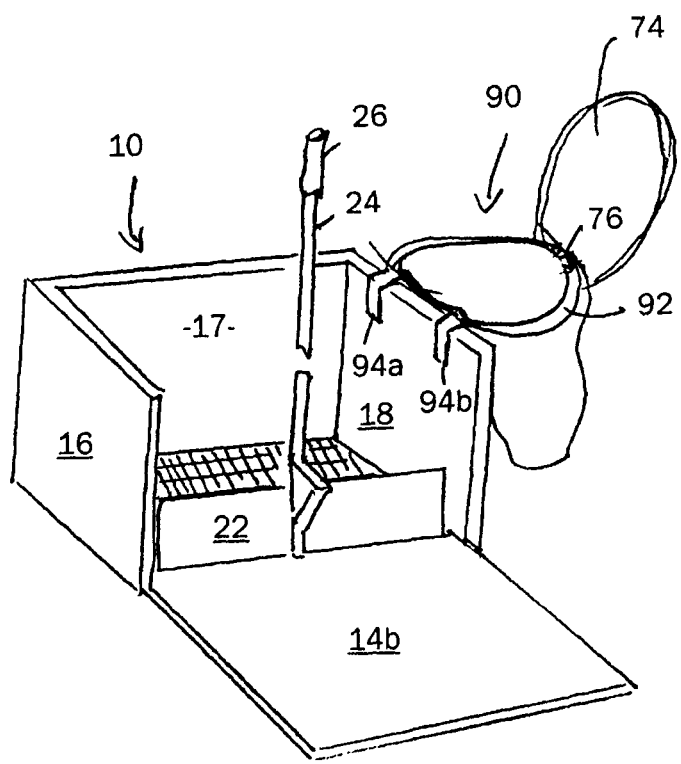
FIG. 26 is a side perspective view of an alternative embodiment of the base structure and an adjoining trash receptacle, wherein the trash receptacle includes a rigid frame and a downward extending bag.

The trash receptacle in another embodiment can be a separate member 80 from the base structure 10 as shown in FIGS. 22, 26 and 29.

Figure 23:
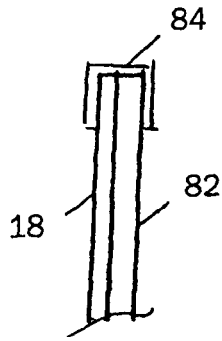
FIG. 23 illustrates a side view of a U-shaped clip which is one embodiment of an adjoining member for affixing a wall of a base structure to a wall of the trash receptacle.
Figure 24:
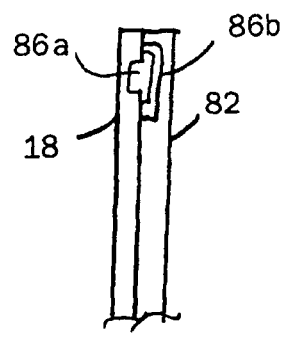
FIG. 24 illustrates a cut-away side view of mating snap members as another embodiment of an adjoining member for affixing a wall of the base structure to a wall of the trash receptacle.
Figure 25:
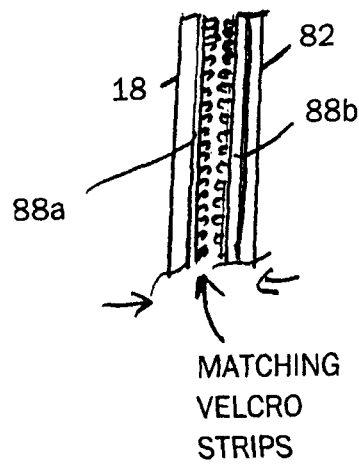
FIG. 25 illustrates a cut-away side view of mating Velcro strips (mating hooks and loops structure) as another embodiment of an adjoining member for affixing a wall of the base structure to a wall of the trash receptacle.

In FIGS. 22 and 29, one wall 82 of separate trash receptacle 80 abuts wall 18 of the base structure 10. The walls are held in this abutting position through the use of appropriate joining members, for example, a U-shaped clip 84 (FIG. 23), mating snap elements 86*a* and 86*b* (FIG. 24), mating hook and loop strips (Velcro strips) 88*a* and 88*b* (FIG. 25), overhanging lip 21 (FIG. 29), or the like. A lid of the same type as shown in FIG. 20 can be used with the separate trash receptacle 80. When the trash receptacle is a separate member from the base structure, the trash receptacle preferably also includes a bail 84 (as shown in FIG. 29) to assist in carrying the trash receptacle if it is to be moved for some reason.

FIG. 26 shows a separate trash receptacle 90 being provided with a rigid frame 92 attached to an upraised wall (e.g., wall 18) of the base structure 10 by appropriate joining means, e.g., hangers 94a and 94b as shown in FIG. 26, or other appropriate means, e.g., snap members, Velcro and the like. The frame 92 can have a lid 74 hingedly or pivotally connected thereto. The frame will have attached thereto a bag for collecting the waste. The bag with collected waste may be removed and disposed of. The bag may be attached to the frame 92 by clips, re-sealable tape, or other joining means (not shown) or threaded onto the frame 92. The lid can be of the same type as in the embodiment of FIG. 20 or different if desired.

Figure 28:
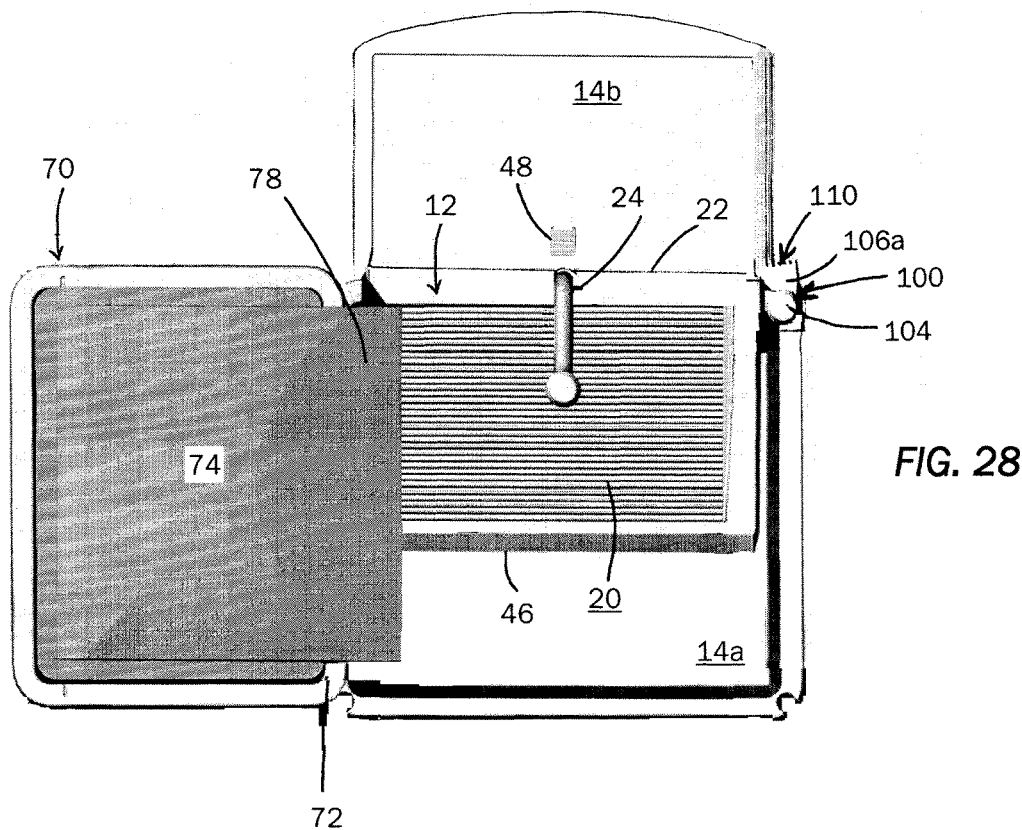
FIG. 28 is a top plan view of FIG. 27.
Figure 29:
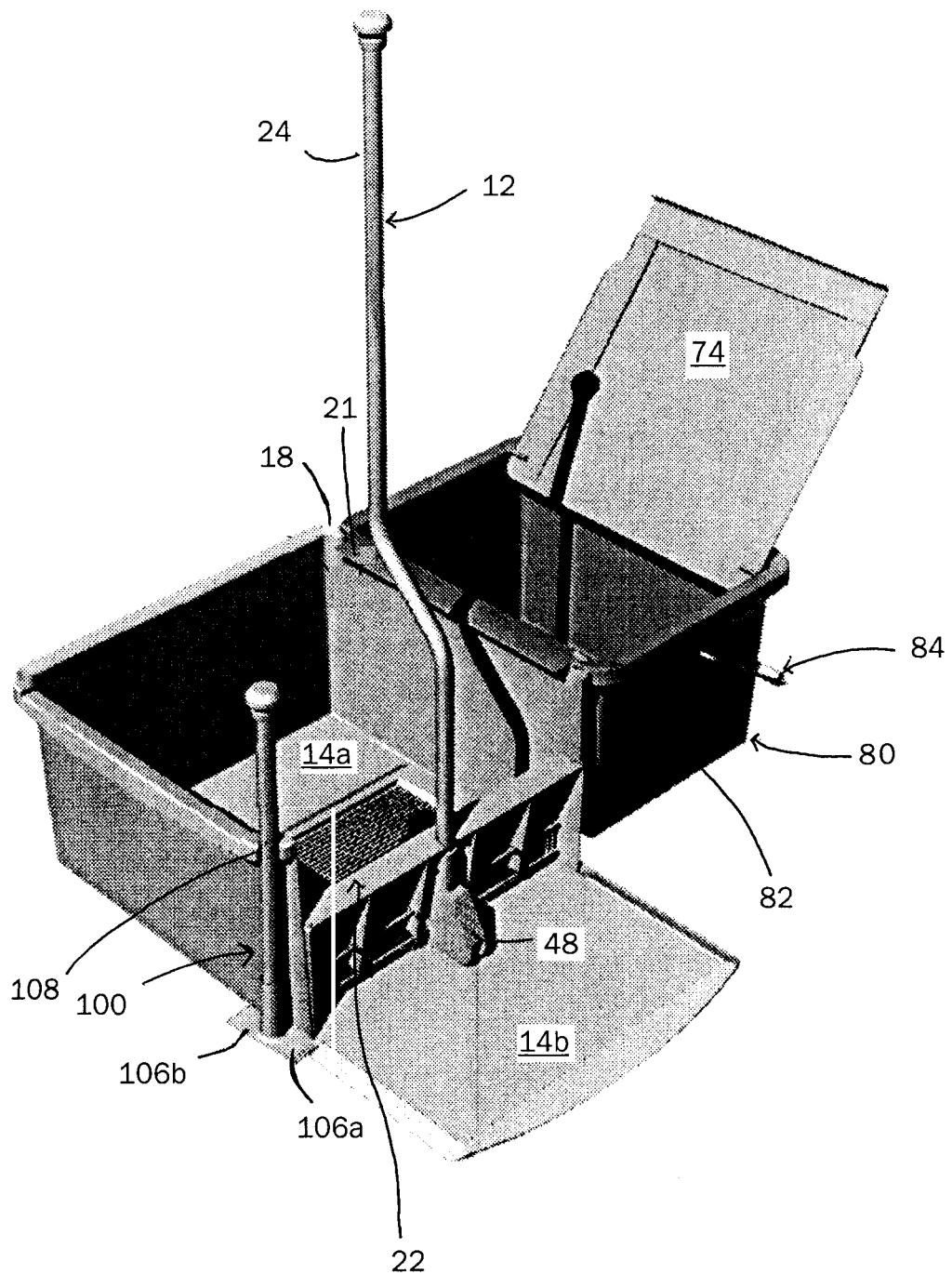
FIG. 29 is a perspective view of the pet litter box system as in FIG. 27 except the lid is in an open position.

The pet litter box and cleaning system is shown in FIGS. 27, 28 and 29 as including the base structure 10, sieve member 12, trash receptacle 70, and a cleaning implement 100. The cleaning implement includes a handle 102, with a grip portion, and a scraper head 106. The handle 102 can be made to be adjustable in length such as described above with respect to the handle portion 24 of the sieve member 12. During non-use, the cleaning implement can be hung in a C-shaped member 108, or other retaining member as made part of or as attached to a wall of the base structure or trash receptacle so as to extend from the wall. In use, the cleaning implement is held by the handle and used to clean any waste material from the sifting portion of the sieve member or used to move waste material present in the base structure onto or better onto the sifting portion. The handle has an extended length and the scraper head extends from the end of the handle at an angle which does not require the user to bend over during use of the cleaning implement. The scraper head 106 is, thus, present at an angle to the handle 102 of equal to or greater than 90° to less than 180°. See FIGS. 27, 30 and 31.

Figure 30:
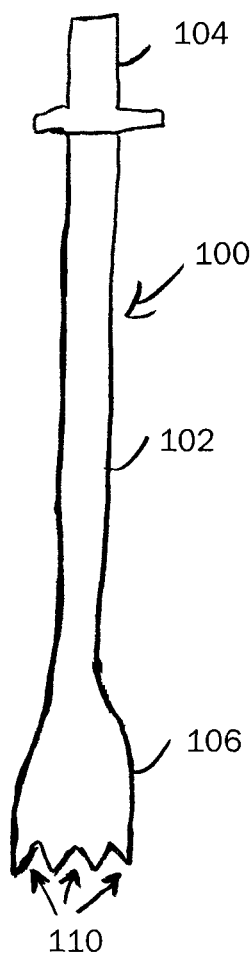
FIG. 30 is a front planar view of one embodiment of a cleaning implement.
Figure 31:
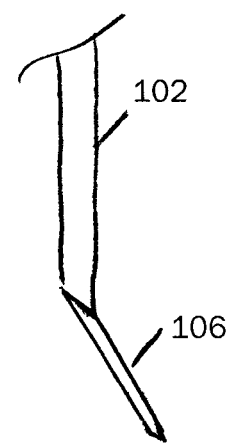
FIG. 31 is a partial side view of the cleaning implement of FIG. 30.
Figure 32:
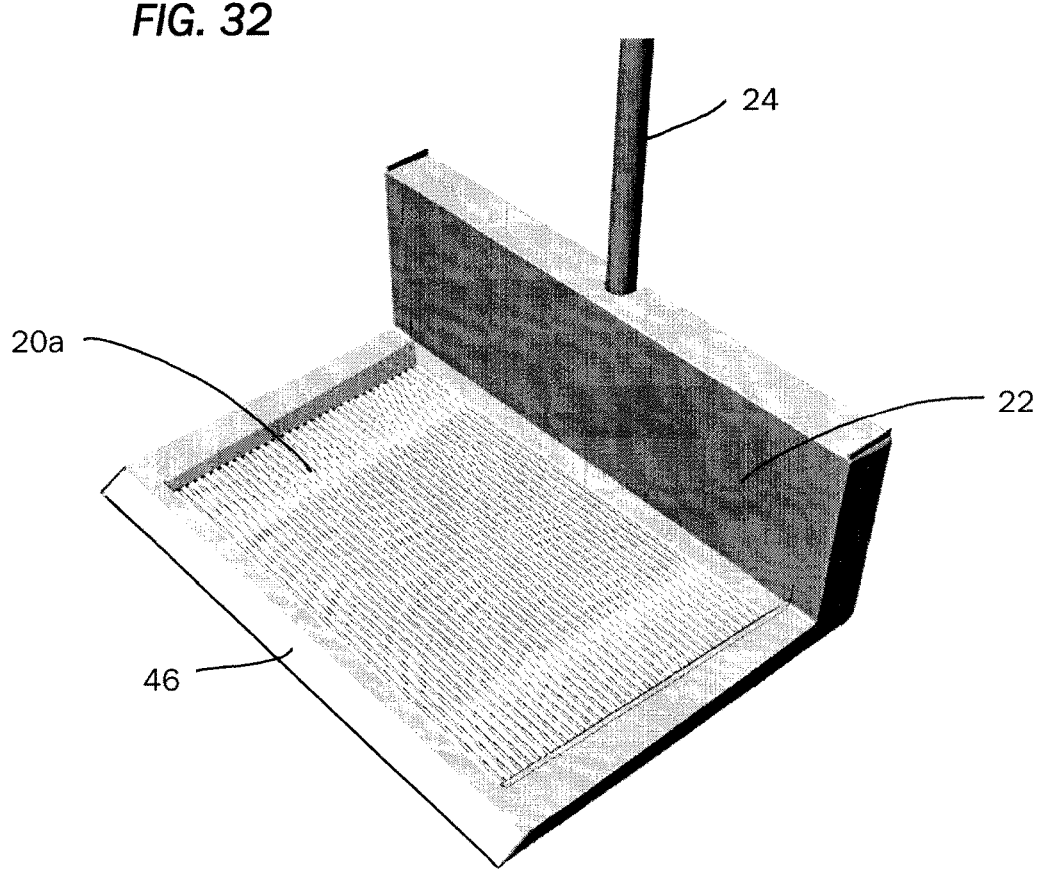
FIG. 32 is a perspective view of a further embodiment of the sifting portion and back wall of the sieve member.
Figure 32A:
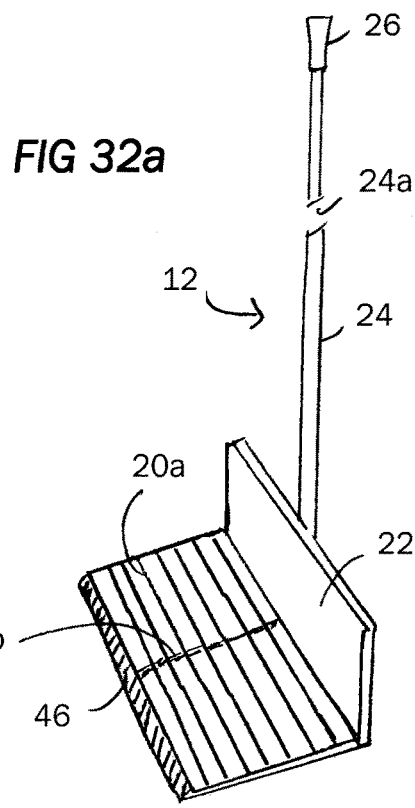
FIG. 32a is a perspective view of a further embodiment of the sifting portion of the sieve member.

The cleaning implement can be of various structures. A preferred structure is shown in FIGS. 30 and 31. Such cleaning implement includes a handle 102 with a grip portion 104 and a scraper head 106. The scraper head 106 preferably includes a plurality of teeth or tines 110 so as to provide points which can extend into the openings in the sifting portion. The angle of the scraper head 106 to the handle 102 is illustrated in FIG. 31. To increase efficiency in use, the crossbars of the sifting portion preferably extend widthwise, as illustrated in FIGS. 32 and 32a and denoted as 20a, to allow for insertion of the teeth 110 between the crossbars over the entire movement thereacross by the scraper head 106. One (or more) lengthwise crossbar(s) 20b may be present to provide rigidity to the widthwise crossbars 20a depending on the strength or rigidity of the widthwise crossbars.

An alternative embodiment of the cleaning implement is shown in FIG. 27 and includes a handle 102 with a grip portion 104 and scraper head 106. In this embodiment, the scraper head includes a front portion 106a and a back portion 106b. Front portion 106a includes a plurality of teeth 110. Back portion 106b has a straight edge for moving waste in the base structure 10 onto the sifting portion of sieve member 12 or for scraping the top surface of the sifting portion to remove any debris adhered thereto.

Exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A pet litter box cleaning system comprising, in combination:
   (a) a base structure comprising a bottom wall including an interior area and an exterior area, one or more upraised walls along a perimeter of said interior area while leaving a portion of the perimeter free of the one or more upraised walls, wherein the exterior area of said bottom wall extends outward from said portion of the perimeter which is free of the one or more upraised walls;
   (b) a sieve member comprising a horizontally planar sifting portion configured to fit in said interior area of said base structure through said portion of the perimeter free of the one or more upraised walls, a back wall extending upward from one end of the sifting portion, and a handle member extending upward of the sifting portion and the back wall; and
   (c) a trash receptacle extending outward from one of said one or more upraised walls of said base structure.

2. The system of claim 1 wherein said one or more upraised walls is a one piece wall.

3. The system of claim 1, wherein said at one or more upraised walls is a plurality of abutting walls.

4. The system of claim 1, wherein said bottom wall comprises a first bottom wall including said interior area and a second bottom wall including said exterior area, and wherein said first bottom wall and said second bottom wall are one piece.

5. The system of claim 1, wherein said handle member has a telescoping structure and is adjustable in height.

6. The system of claim 1, wherein said trash receptacle and said base structure have a common upraised wall.

7. The system of claim 1, wherein said trash receptacle has a lid with an extended lip.

8. The system of claim 1, wherein said trash receptacle is separate from said base structure and abuts said base structure and is held to said base structure by at least one joining member.

9. The system of claim 1, further comprising a cleaning implement comprising a handle portion and a scraper portion.

10. The system of claim 9, wherein the scraper portion extends from an end of said handle portion at an angle of equal to or greater than 90° to less than 180°.

11. The system of claim 9, wherein the scraper portion has a free end with a plurality of outward extending teeth.

12. The system of claim 11, wherein said sifting portion has a plurality of widthwise extending crossbars and said teeth of said scraper portion are spaced apart so as to be insertable between said crossbars.

* * * * *